(12) United States Patent
Wang et al.

(10) Patent No.: US 7,105,949 B2
(45) Date of Patent: Sep. 12, 2006

(54) EMERGENT POWER SUPPLY SYSTEM AND METHOD OF ACHIEVING INPUT CURRENT BALANCE IN SUCH SYSTEM

(75) Inventors: Shyne-Jenq Wang, Taoyuan Hsien (TW); Jen-Chuan Liao, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 406 days.

(21) Appl. No.: 10/763,134

(22) Filed: Jan. 22, 2004

(65) Prior Publication Data

US 2005/0162792 A1 Jul. 28, 2005

(51) Int. Cl.
*H02J 1/10* (2006.01)

(52) U.S. Cl. .............................. 307/51; 307/52; 307/65; 307/82

(58) Field of Classification Search .................. 307/51, 307/52, 65, 82
See application file for complete search history.

(56) References Cited

U.S. PATENT DOCUMENTS 5,796,601 A * 8/1998 Yamamoto .................... 363/84

2005/0073783 A1 * 4/2005 Luo et al. ...................... 361/62

* cited by examiner

*Primary Examiner*—Robert L. Deberadinis
(74) *Attorney, Agent, or Firm*—Madson & Austin

(57) ABSTRACT

An emergent power supply system capable of automatically balancing the input currents of a multiplicity of backup power supply modules therein is addressed. The emergent power supply system according to the present invention includes a multiplicity of backup power supply modules, wherein each of the multiplicity of backup power supply modules includes an input current balancer capable of collecting an operation status information of the backup power supply modules, generating an average of the operation status information, generating a differential value by comparing the average of the operation status information with an operation status information associated with a backup power supply modules thereof, amplifying the differential value in accordance with a predetermined proportion, and instructing an output voltage stabilizer of a rectifier to generate a rectifying control signal according to an amplified differential value to control the on/off operations of the rectifier within the backup power supply modules.

15 Claims, 6 Drawing Sheets

EMERGENT POWER SUPPLY SYSTEM AND METHOD OF ACHIEVING INPUT CURRENT BALANCE IN SUCH SYSTEM

FIELD OF THE INVENTION

The present invention is related to an emergent power supply system, and more particularly to an emergent power supply system capable of achieving input current balance and an input current balancing method used in such system.

BACKGROUND OF THE INVENTION

With the rapid development of information technology and burgeoning expansion in high-tech industry, an uninterruptible power supply (UPS) has been used as an emergent power supply device for a great amount of electronic devices. Most of sophisticated electric instruments and facilities count on high-quality power supply to maintain a normal operation condition. Currently the UPS has become an optimum solution to ensure the best power supply quality in the event of power outage.

Despite the advantages that an UPS can provide, however, when a legacy UPS is put to maintenance or repair, the power conduction passageway of the UPS will be changed by a bypass switch. At this moment, the load will continue to be supported by the unprotected utility power, leaving the load vulnerable to the power grid. In order to solve this problem, a parallel redundant UPS system is proposed such that the load is protected thoroughly and the reliability of the whole power supply system is improved.

FIG. 1 shows a prior art 1+1 parallel redundant UPS system. The parallel 1+1 redundant UPS system shown in FIG. 1 includes a first UPS module UPS-1 and a second UPS module UPS-2. The first UPS module UPS-1 and the second UPS module UPS-2 are configured to be arranged with the same internal circuitries, wherein both comprise a filter/circuit breaker 11,21, a rectifier 12,22 a control switch 13,23, an inverter 14,24, an output circuit breaker 15,25, a bypass circuit 16,26, a battery 17,27, and a controller 18,28, respectively. Both of the first UPS module UPS-1 and the second UPS module UPS-2 are connected to an inlet 100 for coupling an input AC power source and an outlet 101 of a distributed power network for coupling to a load. The operation of an individual UPS module shown in FIG. 1 is as follows. The filter/circuit breaker 11,21 receives an input AC power from an input AC power source through the inlet 100 and filters the input AC power into a filtered AC power. The rectifier 12,22 converts the filtered AC power into a DC power having a predetermined voltage level. The control switch 13,23 receives the DC power from the rectifier 12,22 and also receives a DC power from the battery 17,27. The controller 18,28 determines whether the DC power received from the rectifier 12,22 is within a predetermined tolerance. If the DC power received from the rectifier 12,22 is within a predetermined tolerance, and then the controller 18,28 controls the control switch 13,23 to provide the DC power from the rectifier 12,22 to the inverter 14,24. If the DC power received from the rectifier 12,22 is not within a predetermined tolerance, which may occur due to power outage or power surge problems, the controller 18,28 controls the control switch 13,23 to provide the DC power from the battery 17,27 to the inverter 14,24. The inverter 14,24 receives a DC power under the control of the controller 18,28 and converts the DC power into an AC power, and in turn regulates the AC power to predetermined specifications. The output circuit breaker 15,25 is used to provide electrical isolation between the load and the UPS modules. The bypass circuit 16,26 is connected between the inlet 100 and the outlet 101 of the UPS system. In case of a failure occurred in the interior of an UPS module, power supply is changed to the bypass circuit 16,26 such that the input AC power source is directly couple to the load. In some cases, the rectifier 12,22 may include a battery charger circuitry for providing electric power to charge the battery 17,27 under a normal condition, and the controller 18,28 may transmit the operation status information of the UPS module to a user, either locally using an indicator or display device, or remotely using by communicating with an external monitoring device.

In normal condition, one of the UPS module is taken as a primary UPS module for supplying a critical load power and the other one is taken as a redundant UPS module. In emergency condition, upon failure of the input AC power source (blackout or brownout), both the rectifier 11,21 will shut off and the inverter 14,24 continues to power the load using the battery 17, 27. When the input AC power from the input AC power source is restored prior to complete battery discharge, the rectifier 12,22 automatically start providing power to the inverters 14,24 and simultaneously charge the battery 17,27.

However, in the circuit configuration of FIG. 1, each UPS module includes an individual battery. When the inverter of any one of the UPS modules is malfunctioned, the battery associated therewith is not available to other UPS modules. That would results in a waste in energy usage and an inefficiency in spatial utilization. To negate such unfavorable factors, an UPS system using a common battery to be shared among UPS modules is addressed in order to accommodate the greatest benefit for the battery.

Referring to FIG. 2, a prior art parallel redundant UPS system with common battery operation is illustrated. As shown in FIG. 2, the circuit arrangement of the parallel redundant UPS system is analogous to that of FIG. 1, except that a common battery 30 is located between a first UPS module UPS-1 and a second UPS module UPS-2. The introduction of the common battery 30 substantially reduces the discharging rate of battery and lengthen the backup time. Moreover, it also increases the reliability of UPS systems. Because of the combination of parallel redundancy and common battery arrangement, the parallel redundant UPS system of FIG. 2 has the benefits of module redundant, that is, the rectifier 12 can feed the power for the inverter 24. Also the parallel redundant UPS system with common battery operation can increase the MTBF (mean time between failure) of the UPS module significantly.

However, the prior art UPS system suffers from several disadvantages because of the unbalance among the input currents of the internal UPS modules. Referring to FIG. 1, the first UPS module and the second UPS module are interconnected by a switch Q6. In normal condition, the switch Q6 is opened so that the individual battery will be charged by the rectifier/charger 12,22 respectively. At this moment the rectifiers/chargers 12,22 are not connected in parallel with a distribution power network, there will not induce the problem of unbalanced input currents for the UPS system. In emergent condition, the switch Q6 is closed and the input ends of the rectifier/charger 12,22 are connected together by the distribution power network, the battery 17,27 starts providing DC power to the inverter 14,24 so as to produce backup AC power for the load. Because the input AC power source fails to provide input AC power to the UPS module, there will not induce the problem of unbalanced input currents for the UPS system. However, as described above this configuration has the negative factors of inefficient usage of battery power and costly manufacturing budget on battery.

Referring to FIG. 2, in normal condition, the control switches 13,23 are all turned on and the common battery 30 is charged via one of the UPS module. Therefore, the rectifiers/chargers 12, 22 are not connected in parallel with a distributed power network. Because the input impedance of each UPS module is different with one another, the input currents of the UPS modules become unbalanced. The unbalanced input currents may cause severe problems to the rectifier 12,22, for example, the rectifier 12,22 may be overloaded and the semiconductor components used therein may have a shorter lifetime due to overheating.

In view of the foregoing problems, there is a tendency to develop an emergent power supply system provided with an input current balancing function among backup power supply modules associated therewith.

SUMMARY OF THE INVENTION

A first object of the present invention is to provide an emergent power supply system provided with an input current balancing function among backup power supply modules associated therewith.

A second object of the present invention is to provide a method of achieving input current balance in an emergent power supply system.

The first object of the present invention is attained by an emergent power supply system, wherein the emergent power supply system includes an inlet coupled to an input power source, a multiplicity of backup power supply modules coupled to the inlet for generating a backup power, and an outlet coupled to the multiplicity of backup power supply modules for providing the backup power to a load, and wherein each of the multiplicity of backup power supply modules comprises an input current balancer for collecting an operation status information associated with the multiplicity of backup power supply modules and equalizing the input currents of the multiplicity of backup power supply modules with each other based on an average of the operation status information.

The second object of the present invention is made by the provision of an input current balancing method for use in an emergent power supply system comprising a multiplicity of backup power supply modules. The input current balancing method suggested herein is accomplished by several steps, including: (a) collecting an operation status information of the multiplicity of backup power supply modules, (b) generating an average of the operation status information, (c) generating a differential value by comparing the average of the operation status information with an operation status information associated with one of the multiplicity of backup power supply modules, (d) amplifying the differential value in accordance with a predetermined proportion, and (e) generating a rectifying control signal in accordance with an amplified differential value to control the on/off operations of a power conversion apparatus within the multiplicity of backup power supply modules.

Now the foregoing and other features and advantages of the present invention will be best understood through the following descriptions with reference to the accompanying drawings, wherein:

DETAILED DESCRIPTION OF THE PREFERRED EMBODIMENT

An exemplary embodiment embodying the features and advantages of the present invention will be expounded in the following paragraphs of descriptions. It is to be realized that the present invention is allowed to have various modification in different respects, all of which are without departing from the scope of the present invention, and the description herein and the drawings are intended to be taken as illustrative in nature, and are not limitative.

Figure 3:
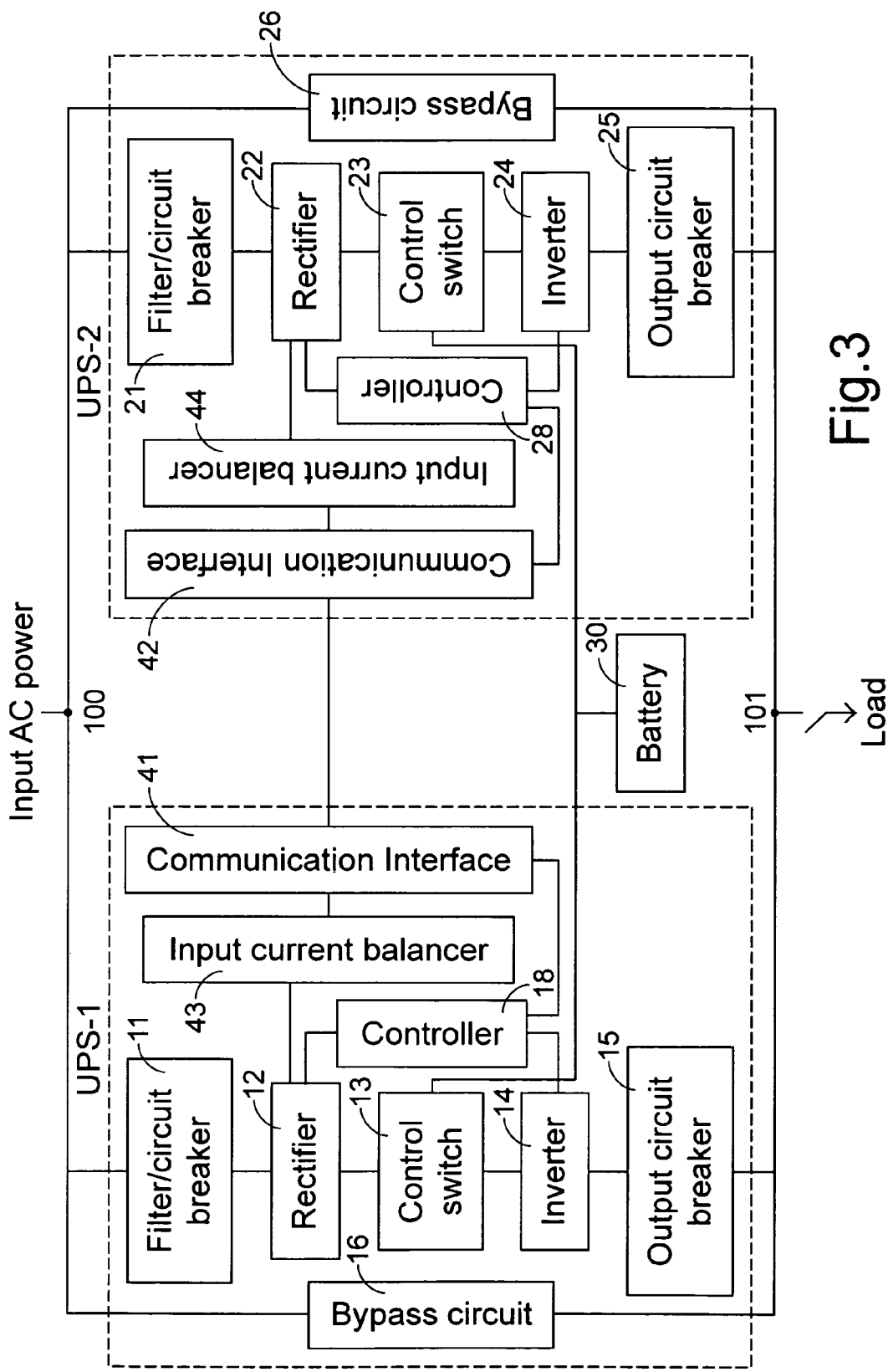
FIG. 3 shows a parallel redundant emergent power supply system provided with an input current balancing function according to an exemplary embodiment of the present invention.
Figure 4:
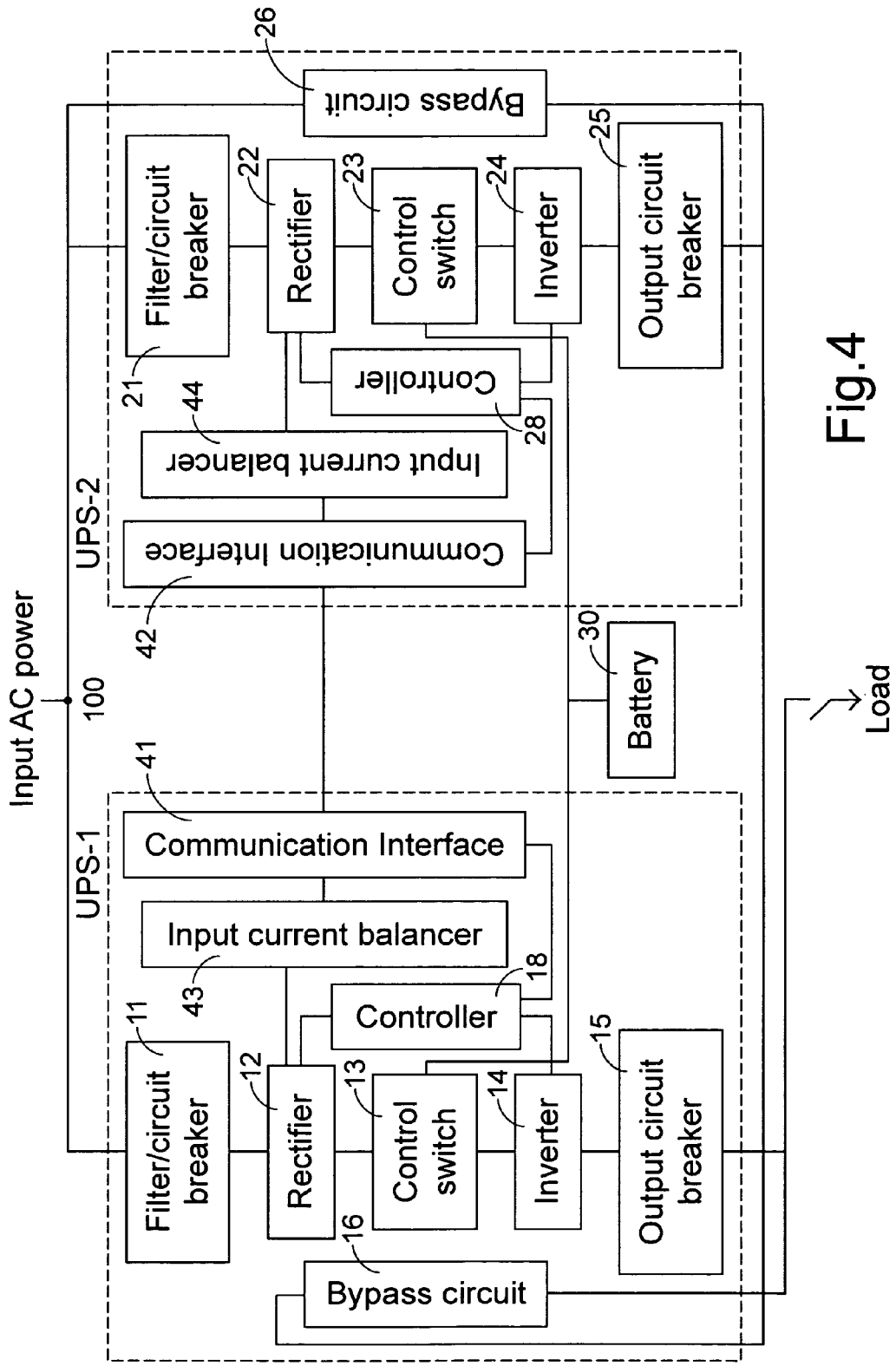
FIG. 4 shows a hot swappable redundant emergent power supply system provided with an input current balancing function according to an exemplary embodiment of the present invention.

A typical arrangement of an emergent power supply system according to an exemplary embodiment of the present invention is depicted in FIGS. 3 and 4, wherein FIG. 3 shows an emergent power supply system based on parallel redundant operations, and FIG. 4 shows an emergent power supply system based on hot swappable operations. The emergent power supply system shown in FIG. 4 is referred to as a hot swappable UPS system, in which one of the UPS modules installed therein is taken as a main power supply for powering a sensitive load while others are used as a redundant power supply. The hot swappable UPS system as shown in FIG. 4 allows the main UPS module to be replaced while the UPS system is operating.

Figure 1:
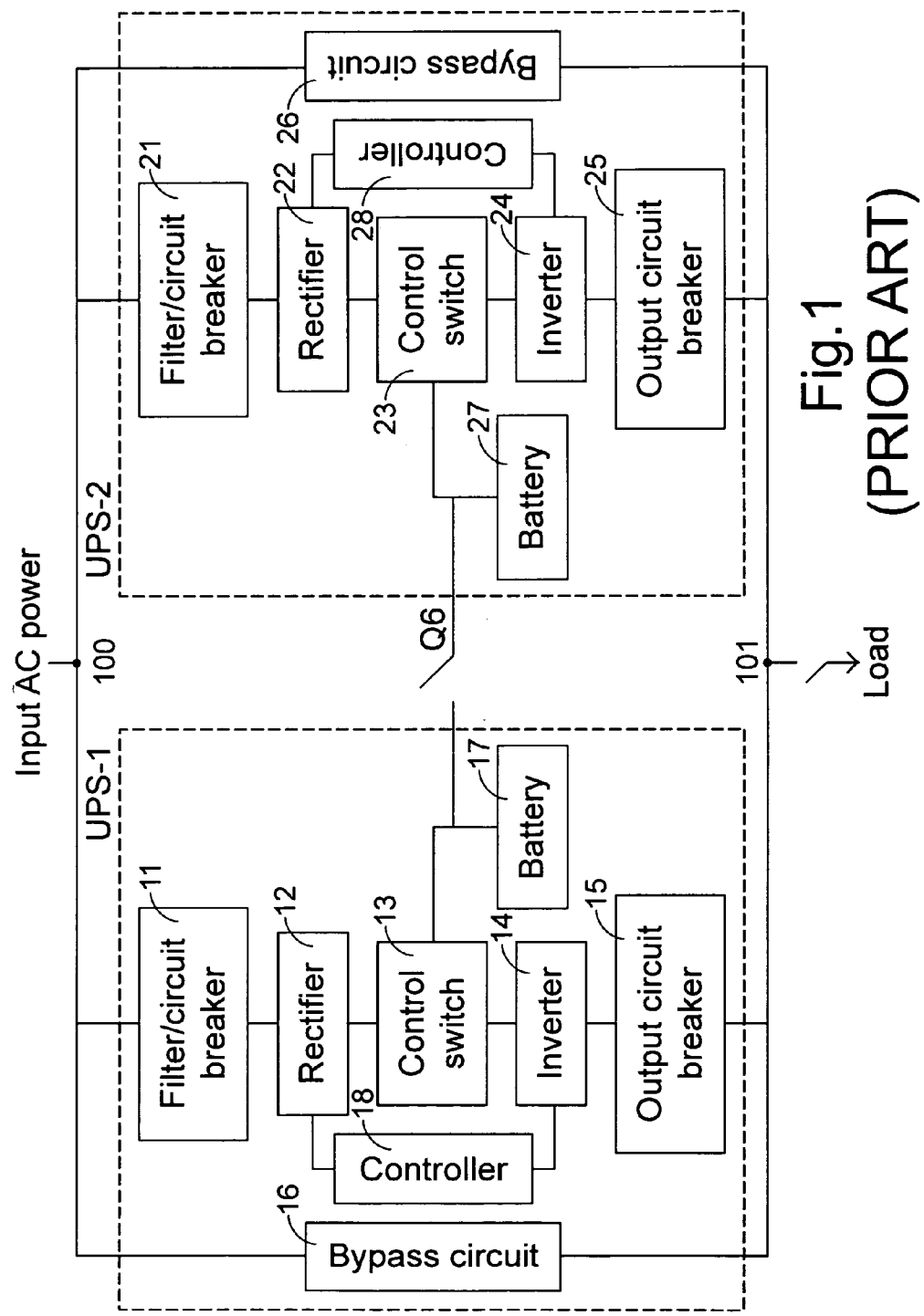
FIG. 1 shows a prior art parallel redundant UPS system.
Figure 2:
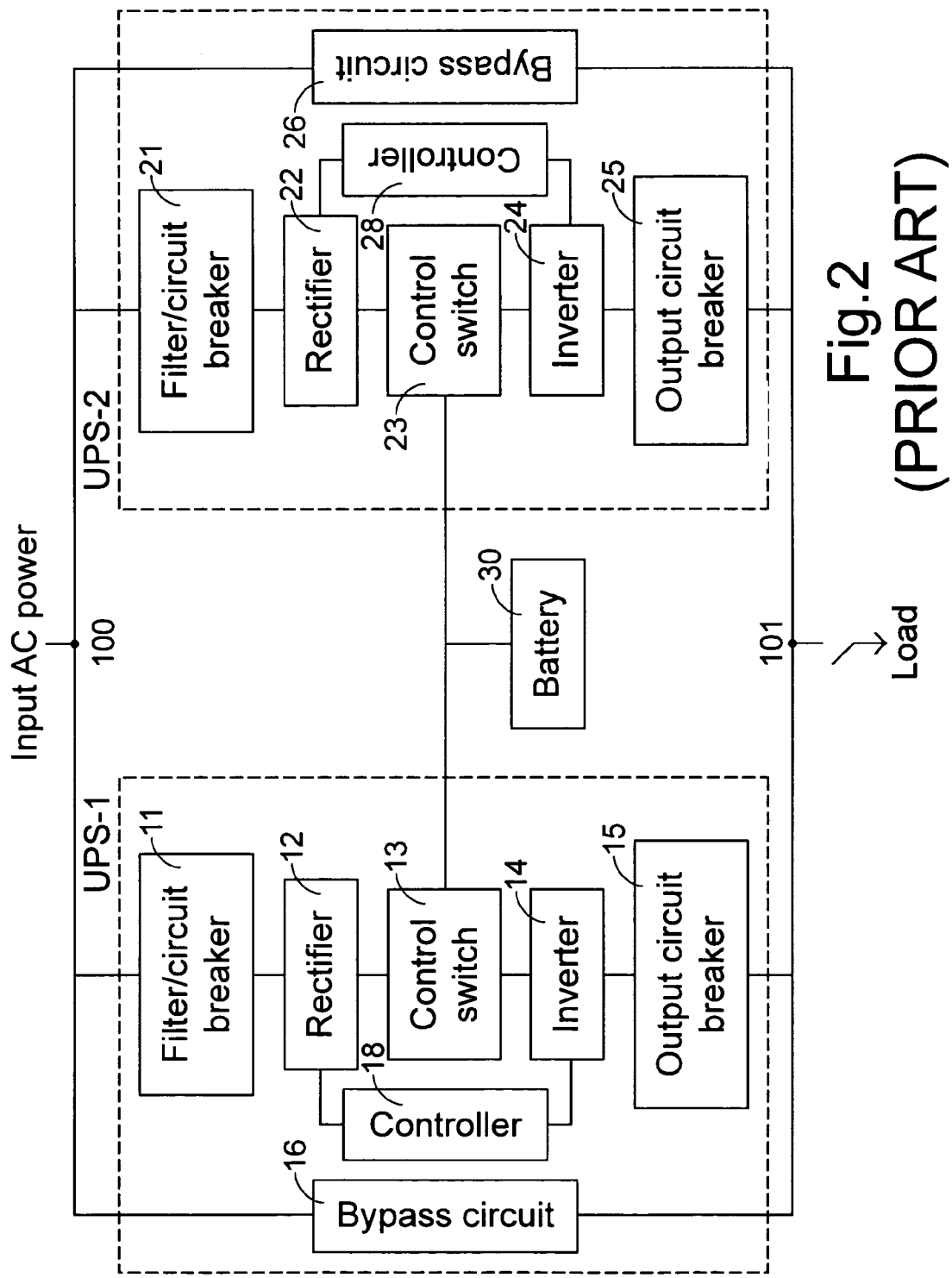
FIG. 2 shows a prior art parallel redundant UPS system using a common battery.

Referring to FIGS. 3 and 4, the emergent power supply system of FIG. 3 or FIG. 4 according to the present exemplary embodiment includes internal components with a high similarity to the UPS system of FIG. 2. For example, each of the backup power supply modules shown in FIGS. 3 and 4 includes a filter/circuit breaker 11,21 that receives an input AC power from an input AC power source through an inlet 100 and filters the input AC power into a filtered AC power, a rectifier 12,22 that converts the filtered AC power into a DC power having a predetermined voltage level, a control switch 13,23 receives the DC power from the rectifier 12,22 and also receives a DC power from a common battery 30, a controller 18,28 that determines whether the DC power received from the rectifier 12,22 is within a predetermined tolerance, an inverter 14,24 that receives a DC power under the control of the controller 18,28 and converts the DC power into an AC power, and in turn regulates the AC power to predetermined specifications, an output circuit breaker 15,25 that provides electrical isolation between the load and the UPS modules, a bypass circuit 16,26 that switches the power supply to the load from the UPS modules to the input power source in the event that the UPS modules fail, and a common battery that provides DC power to the inverter 14,24. Moreover, each of the backup power supply modules within the emergent power supply system of FIG. 3 or FIG. 4 includes a communication interface 41,42 coupled to the controller 18, 28 that delivers the operation status information about the backup power supply module associated therewith, for example, input current value, input power value, to other back power supply modules, so that the backup power supply modules can exchange their operation status information with each other. Further, each of the backup power supply modules within the emergent power supply system of FIG. 3 or FIG. 4 includes an input current balancer 43, 44 coupled between the communication interface 41,42 and the rectifier 12,22. The main purpose of the input current balancer 43, 44 is to equalize the input currents of the backup power supple modules based on an average of the operation status information collected from the communication interface 41, 42. As to the topology and operation principle of the input current balancer 43,44, it will be described in detailed as follows.

Figure 5:
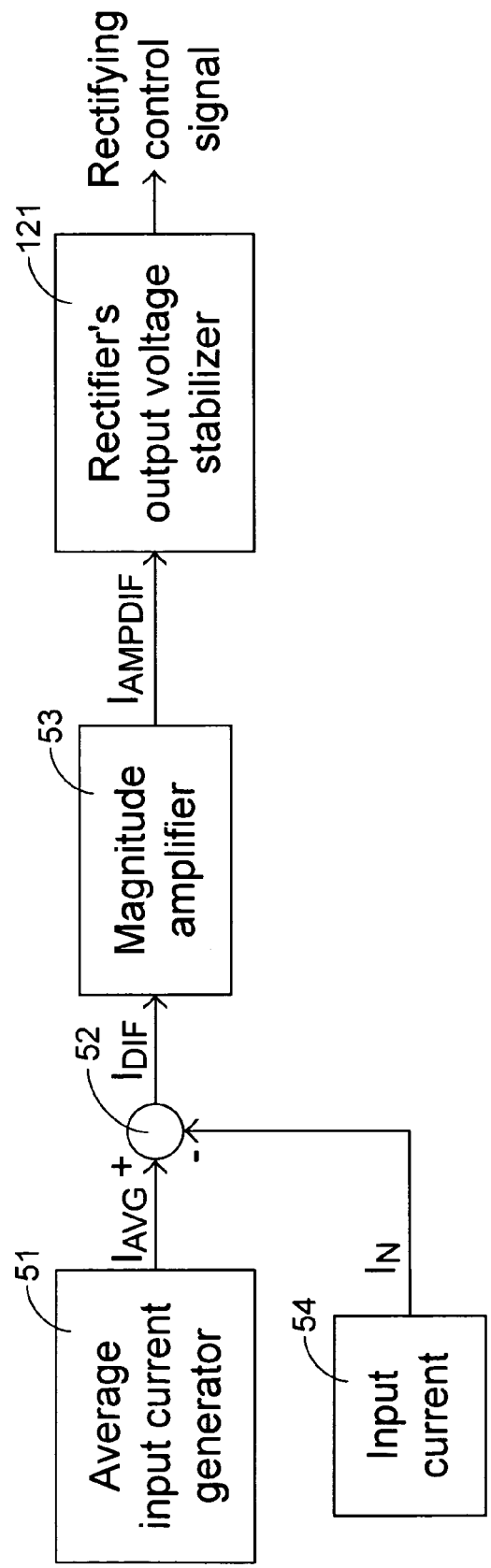
FIG. 5 shows a possible layout of the system for carrying out the input current balancing method according to a first preferred embodiment of the present invention.

References are now made to FIG. 5, a possible layout of the system for carrying out the input current balancing method according to a first embodiment of the present invention is illustrated. In FIG. 5, the input current balancer 43,44 includes an average input current generator 51 which collects the operation status information from a multiplicity of backup power supply modules, i.e. the input currents of the multiplicity of backup power supply modules, and calculates an average input current $I_{AVG}$ by summing the input currents of the multiplicity of backup power supply module and dividing the sum of the input currents by the number of the multiplicity of backup power supply modules. The calculated average input current $I_{AVG}$ is then compared with an input current $I_N$ associated with a backup power supply module thereof by an adder-subtractor 52 coupled to the average input current generator 51 in order to generate a differential input current $I_{DIF}$. The differential input current $I_{DIF}$ is then amplified by a magnitude amplifier 53 coupled to the adder-subtractor 52 in accordance with a predetermined proportion, wherein the magnitude amplifier 53 is typically implemented by a PID (proportional-integral and derivative) controller. The amplified differential input current $I_{AMPDIF}$ is subsequently fed to an output voltage stabilizer 121 of the rectifier 12. The output voltage stabilizer 121 of the rectifier 12 is configured to generate a rectifying control signal according to the amplified differential input current $I_{AMPDIF}$ and employ the rectifying control signal to control the on/off operations of the rectifier 12. Therefore the output DC voltage of the rectifier 12 is under regulation such that the input currents of the multiplicity of backup power supply modules are balanced with each other automatically.

Figure 6:
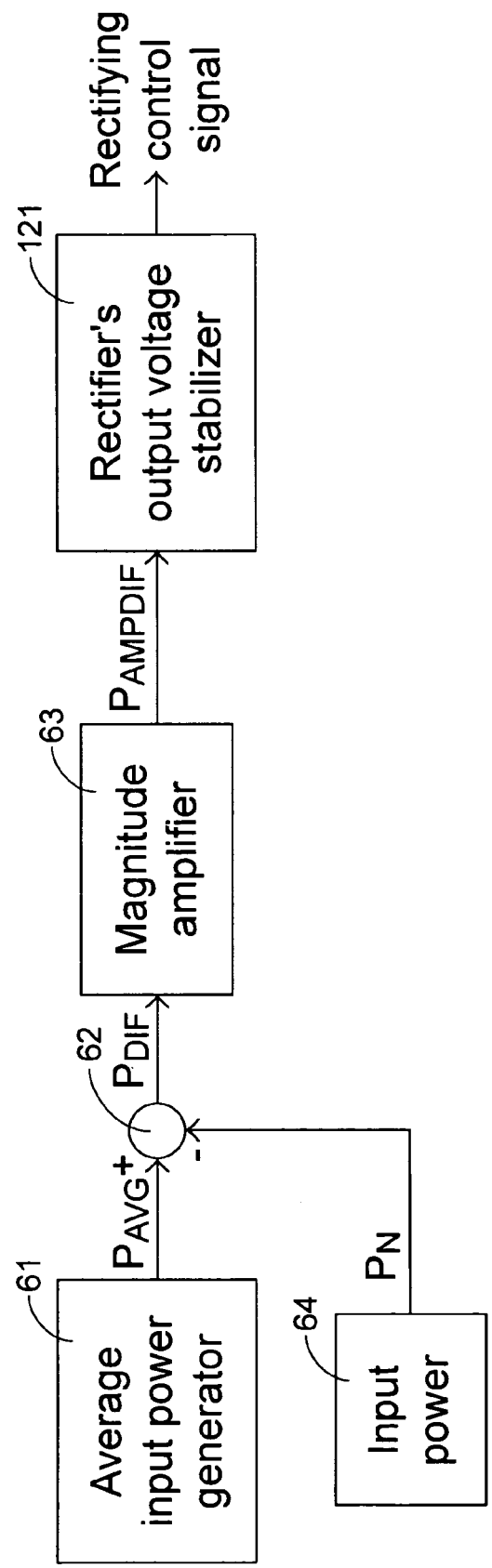
FIG. 6 shows a possible layout of the system for carrying out the input current balancing method according to a second preferred embodiment of the present invention.

References are now made to FIG. 6, an alternative embodiment illustrating a possible layout of the system for carrying out the input current balancing method according to a second embodiment of the present invention is illustrated. The system used to achieve input current balance as shown in FIG. 6 is analogous to that of FIG. 5, however, the system as indicated in FIG. 6 uses an average input power generator 61 which collects the input powers of a multiplicity of backup power supply modules and generates an average input power $P_{AVG}$ by summing the input powers of the multiplicity of backup power supply modules and dividing the sum of the input powers by the number of the multiplicity of backup power supply modules. The average input power $P_{AVG}$ is then compared with an input power $P_N$ associated with a backup power supply module thereof by an adder-subtractor 62 coupled to the average input power generator 61 in order to generate a differential input current $P_{DIF}$. The differential input power current $P_{DIF}$ is then amplified by a magnitude amplifier 63 coupled to the adder-subtractor 62 in accordance with a predetermined proportion, wherein the magnitude amplifier 63 is typically implemented by a PID (proportional-integral and derivative) controller. The amplified differential input current $P_{AMPDIF}$ is subsequently fed to an output voltage stabilizer 121 of the rectifier 12. The output voltage stabilizer 121 of the rectifier 12 is configured to generate a rectifying control signal according to the amplified differential input power $P_{AMPDIF}$ and employ the rectifying control signal to control the on/off operations of the rectifier 12. Therefore the output DC voltage of the rectifier 12 is under regulation such that the input currents of the multiplicity of backup power supply modules are balanced with each other automatically.

In conclusion, the present invention accommodates an emergent power supply system capable of automatically balancing the input currents of a multiplicity of backup power supply modules therein and a method implementing the same. The architecture for balancing the input currents of an emergent power supply system suggested herein is based on an input current balancer that is able to collect the input currents or the input powers of a multiplicity of backup power supply modules, average the input currents or input powers into an average input current or an average input power, generate a differential input current or a differential input power by evaluating the difference between the average input current or the average input power with an input current or an input power associated with the backup power supply thereof, and enable an output voltage stabilizer of a rectifier to generate a rectifying control signal to control the on/off operations of the rectifier. Through the introduction of the input current balancer, the disadvantages of unbalanced input currents existing in a conventional UPS system due to the different input impedances among the UPS modules therein can be totally removed, and the rectifier installed within the UPS module can be securely protected from suffering rectifier overload problems.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An emergent power supply system comprising:
   an inlet coupled to an input power source;
   a multiplicity of backup power supply modules coupled to the inlet for generating a backup power; and
   an outlet coupled to the multiplicity of backup power supply modules for providing the backup power to a load;
   wherein each of the multiplicity of backup power supply modules comprises an input current balancer for collecting an operation status information associated with the multiplicity of backup power supply modules, and equalizing the input currents of the multiplicity of backup power supply modules with each other based on an average of the operation status information.

2. The emergent power supply system of claim 1 wherein each of the multiplicity of backup power supply modules includes:

a controller for monitoring the operation status information of the multiplicity of backup power supply modules; and a communication interface for transmitting the operation status information of the multiplicity of backup power supply modules.

3. The emergent power supply system of claim 2 wherein the input current balancer comprises:

an average input current generator which receives the input currents of the multiplicity of backup power supply modules from the communication interface and generates an average input current by dividing a sum of the input currents by a number of the multiplicity of backup power supply modules;

an adder-subtractor coupled to the average input current generator for comparing the average input current with an input current associated with a backup power supply module thereof and in response thereto generating a differential input current; and a magnitude amplifier coupled to the adder-subtractor for amplifying the differential input current in accordance with a predetermined proportion.

4. The emergent power supply system of claim 3 wherein the magnitude amplifier is implemented by a PID (proportional-integral and derivative) controller.

5. The emergent power supply system of claim 3 wherein each of the multiplicity of the backup power supply modules includes a rectifier for converting an AC power into a DC power having a predetermined voltage level, and wherein the rectifier includes an output voltage stabilizer for receiving an amplified differential input current from the magnitude amplifier and in response thereto generating a rectifying control signal to control the on/off operations of the rectifier.

6. The emergent power supply system of claim 2 wherein the input current balancer comprises:

an average input power generator which receives the input powers of the multiplicity of backup power supply modules from the communication interface and generates an average input power by dividing a sum of the input powers by a number of the multiplicity of backup power supply modules;

an adder-subtractor coupled to the average input power generator for comparing the average input power with an input power associated with a backup power supply module thereof and in response thereto generating a differential input power; and a magnitude amplifier coupled to the adder-subtractor for amplifying the differential input power in accordance with a predetermined proportion.

7. The emergent power supply system of claim 4 wherein the magnitude amplifier is implemented by a PID (proportional-integral and derivative) controller.

8. The emergent power supply system of claim 5 wherein each of the multiplicity of the backup power supply modules includes a rectifier for converting an AC power into a DC power having a predetermined voltage level, and wherein the rectifier includes an output voltage stabilizer for receiving an amplified differential input power from the magnitude amplifier and in response thereto generating a rectifying control signal to control the on/off operations of the rectifier.

9. The emergent power supply system of claim 1 wherein the emergent power supply system is operating in accordance with a parallel redundant operation or a hot swappable operation.

10. A method of balancing input currents among a multiplicity of backup power supply modules in an emergent power supply system, comprising the steps of:

collecting an operation status information of the multiplicity of backup power supply modules;

generating an average of the operation status information;

generating a differential value by comparing the average of the operation status information with an operation status information associated with one of the multiplicity of backup power supply modules;

amplifying the differential value in accordance with a predetermined proportion; and generating a rectifying control signal in accordance with an amplified differential value to control the on/off operations of a power conversion apparatus within the multiplicity of backup power supply modules.

11. The method of balancing input currents according to claim 10 wherein the operation status information comprises the input currents or the input powers of the multiplicity of backup power supply modules.

12. The method of balancing input currents according to claim 10 wherein the step of generating a differential value is performed by an adder-subtractor.

13. The method of balancing input currents according to claim 10 wherein the step of the differential value in accordance with a predetermined proportion is performed by a PID (proportional-integral and derivative) controller.

14. The method of balancing input currents according to claim 10 wherein the power conversion apparatus comprises a rectifier.

15. The method of balancing input currents according to claim 10 wherein the multiplicity of backup power supply modules are operating in accordance with a parallel redundant operation or a hot swappable operation.

* * * * *